（12）United States Patent　　　　　　　　　　(10) Patent No.: US 11,483,534 B2
Yun et al.　　　　　　　　　　　　　　　　　　　(45) Date of Patent: Oct. 25, 2022

(54) METHOD FOR PROCESSING IMMERSIVE VIDEO AND METHOD FOR PRODUCING IMMERSIVE VIDEO

(71) Applicant: Electronics and Telecommunications Research Institute, Daejeon (KR)

(72) Inventors: Kug Jin Yun, Daejeon (KR); Jun Young Jeong, Seoul (KR); Gwang Soon Lee, Daejeon (KR); Hong Chang Shin, Daejeon (KR); Ho Min Eum, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

(21) Appl. No.: 17/006,389

(22) Filed: Aug. 28, 2020

(65) Prior Publication Data

US 2021/0067757 A1　Mar. 4, 2021

(30) Foreign Application Priority Data

Aug. 29, 2019　(KR) ......................... 10-2019-0106718
Sep. 18, 2019　(KR) ......................... 10-2019-0114843
(Continued)

(51) Int. Cl.
*H04N 13/161*　　(2018.01)
*H04N 13/178*　　(2018.01)
(Continued)

(52) U.S. Cl.
CPC .......... *H04N 13/161* (2018.05); *G06T 15/20* (2013.01); *H04N 13/178* (2018.05); *H04N 13/282* (2018.05); *H04N 2013/0088* (2013.01)

(58) Field of Classification Search
CPC .... G06T 15/20; H04N 13/161; H04N 13/178; H04N 13/282; H04N 19/167;
(Continued)

(56) References Cited

U.S. PATENT DOCUMENTS 10,333,553　B2　6/2019　Park et al.
10,410,094　B2　9/2019　Yoon et al.
(Continued)

FOREIGN PATENT DOCUMENTS

KR　　1020180013879 A　　2/2018
KR　　1020190095430 A　　8/2019

OTHER PUBLICATIONS

Jill Boyce et al., Working Draft 2 of Metadata for Immersive Video, International Organisation for Standardisation Organisation Internationale De Normalisation ISO/IEC JTC1/SC29/WG11 Coding of Moving Pictures and Audio, N18576, Jul. 2019, Gothenburg, SE.

*Primary Examiner* — Thai Q Tran
*Assistant Examiner* — Stephen R Smith
(74) *Attorney, Agent, or Firm* — William Park & Associates Ltd.

(57) ABSTRACT

Disclosed herein is an immersive video processing method. The immersive video processing method includes: determining a priority order of pruning for source videos; extracting patches from the source videos based on the priority order of pruning; generating at least one atlas based on the extracted patches; and encoding metadata. Herein, a first flag indicating whether or not an atlas includes a patch including information on an entire region of a first source video may be encoded into the metadata.

5 Claims, 9 Drawing Sheets

(30) Foreign Application Priority Data

| Sep. 25, 2019 | (KR) | 10-2019-0118157 |
| Apr. 1, 2020 | (KR) | 10-2020-0039979 |
| Apr. 3, 2020 | (KR) | 10-2020-0040946 |
| Jun. 18, 2020 | (KR) | 10-2020-0074168 |
| Aug. 10, 2020 | (KR) | 10-2020-0099704 |

(51) Int. Cl.
  *G06T 15/20* (2011.01)
  *H04N 13/282* (2018.01)
  *H04N 13/00* (2018.01)

(58) Field of Classification Search
  CPC .... H04N 19/172; H04N 19/59; H04N 19/597; H04N 19/70; H04N 2013/0088
  USPC .......................................................... 348/43
  See application file for complete search history.

(56) References Cited

U.S. PATENT DOCUMENTS

| 10,931,980 | B2* | 2/2021 | Bang | H04N 21/234327 |
| 2016/0381398 | A1 | 12/2016 | Saxena et al. | |
| 2019/0387212 | A1 | 12/2019 | Oh | |
| 2020/0294271 | A1* | 9/2020 | Ilola | G06T 9/00 |
| 2021/0006834 | A1* | 1/2021 | Salahieh | H04N 19/597 |
| 2021/0211724 | A1* | 7/2021 | Kim | H04N 19/46 |
| 2021/0217200 | A1* | 7/2021 | Oh | H04N 19/597 |
| 2021/0409670 | A1* | 12/2021 | Oh | H04N 13/161 |

\* cited by examiner

Patch video (a)

Atlas (b)

METHOD FOR PROCESSING IMMERSIVE VIDEO AND METHOD FOR PRODUCING IMMERSIVE VIDEO

CROSS REFERENCE TO RELATED APPLICATION

The present application claims priority to Korean Patent Application No. 10-2019-0106718, filed Aug. 29, 2019, 10-2019-0114843, filed Sep. 18, 2019, 10-2019-0118157, filed Sep. 25, 2019, 10-2020-0039979, filed Apr. 1, 2020, 10-2020-0040946, filed Apr. 3, 2020, 10-2020-0074168, filed Jun. 18, 2020, 10-2020-0099704, filed Aug. 10, 2020, the entire contents of which are incorporated herein for all purposes by this reference.

BACKGROUND OF THE INVENTION

Field of the Invention

The present disclosure relates to a processing/synthesizing method for an immersive video supporting motion parallax for rotational and translation motions.

Description of the Related Art

Virtual reality service evolves towards maximizing senses of immersion and realism by generating an omni-directional video in realistic or CG (Computer Graphics) format and reproducing the video on an HMD (Head Mounted Display), a smart phone and the like. It is currently known that 6 DoF (Degrees of Freedom) needs to be supported in order to play a natural and highly immersive omni-directional video through an HMD. A 6 DoF video provided on an HMD should be a free video in six directions including (1) the horizontal movement, (2) the vertical rotation, (3) the vertical movement and (4) the horizontal rotation. However, most omni-directional videos based on real images are currently supporting only rotational movements. Therefore, researches on such technical fields as the acquisition and reproduction of 6 DoF omni-directional videos are actively under way.

SUMMARY OF THE INVENTION

For a large-capacity immersive video service supporting motion parallax, the present disclosure is directed to provide a file format enabling video reproduction that supports motion parallax only by transmitting as small a video and as little metadata as possible.

Also, the present disclosure is directed to provide an encoding/decoding structure of information for viewport video synthesis.

Also, the present invention is directed to provide a method of determining a priority order of pruning among additional view videos.

The technical objects of the present disclosure are not limited to the above-mentioned technical objects, and other technical objects that are not mentioned will be clearly understood by those skilled in the art through the following descriptions.

An immersive video processing method according to the present disclosure may include: determining a priority order of pruning for source videos; extracting patches from the source videos based on the priority order of pruning; generating at least one atlas based on the extracted patches; and encoding metadata. Herein, a first flag indicating whether or not an atlas includes a patch including information on an entire region of a first source video may be encoded into the metadata.

In an immersive video processing method according to the present disclosure, when the value of a second flag is true which indicates whether or not the first source video is included in the atlas, the first flag may be encoded.

In an immersive video processing method according to the present disclosure, the first flag and the second flag may be encoded, when a third flag is true which indicates whether or not the first flag and the second flag are encoded for each source video.

In an immersive video processing method according to the present disclosure, the metadata may include information indicating a type of the atlas, and the type may indicate whether or not the atlas is used for view rendering.

In an immersive video processing method according to the present disclosure, generating an occupancy map corresponding to the atlas may be further included, and the metadata may further include information indicating whether or not the occupancy map and the atlas are encoded in different sizes.

In an immersive video processing method according to the present disclosure, the metadata may include camera coordinate system information, and the camera coordinate system information may be intended to determine positive directions of x-axis, y-axis and z-axis.

An immersive video synthesizing method according to the present disclosure may include: parsing video data and metadata from a bitstream; obtaining at least one atlas by decoding the video data; and extracting patches required for viewport video synthesis according to a user movement from the atlas based on metadata. Herein, the metadata may include a first flag indicating whether or not an atlas includes a patch including information on the whole region of a first source video.

In an immersive video synthesizing method according to the present disclosure, when the value of a second flag is true which indicates whether or not the first source video is included in the atlas, the first flag may be decoded.

In an immersive video synthesizing method according to the present disclosure, the first flag and the second flag may be decoded, when a third flag is true which indicates whether or not the first flag and the second flag are present for each source video.

In an immersive video synthesizing method according to the present disclosure, the metadata may include information indicating a type of the atlas, and the type may indicate whether or not the atlas is used for view rendering.

In an immersive video synthesizing method according to the present disclosure, obtaining an occupancy map corresponding to the atlas may be further included, and the metadata may further include information indicating whether or not the occupancy map and the atlas are different in size.

In an immersive video synthesizing method according to the present disclosure, the metadata may include camera coordinate system information, and the camera coordinate system information may be intended to determine positive directions of x-axis, y-axis and z-axis.

The features briefly summarized above with respect to the present disclosure are merely exemplary aspects of the detailed description below of the present disclosure, and do not limit the scope of the present disclosure.

The present invention may provide a file format that enables video reproduction supporting motion parallax by transmitting as small a video and metadata as possible.

The present disclosure may provide an encoding/decoding structure of information for viewport video synthesis.

The present disclosure may provide a method of determining a priority order of pruning among additional view videos.

Effects obtained in the present disclosure are not limited to the above-mentioned effects, and other effects not mentioned above may be clearly understood by those skilled in the art from the following description.

DETAILED DESCRIPTION OF THE INVENTION

Figure 1:
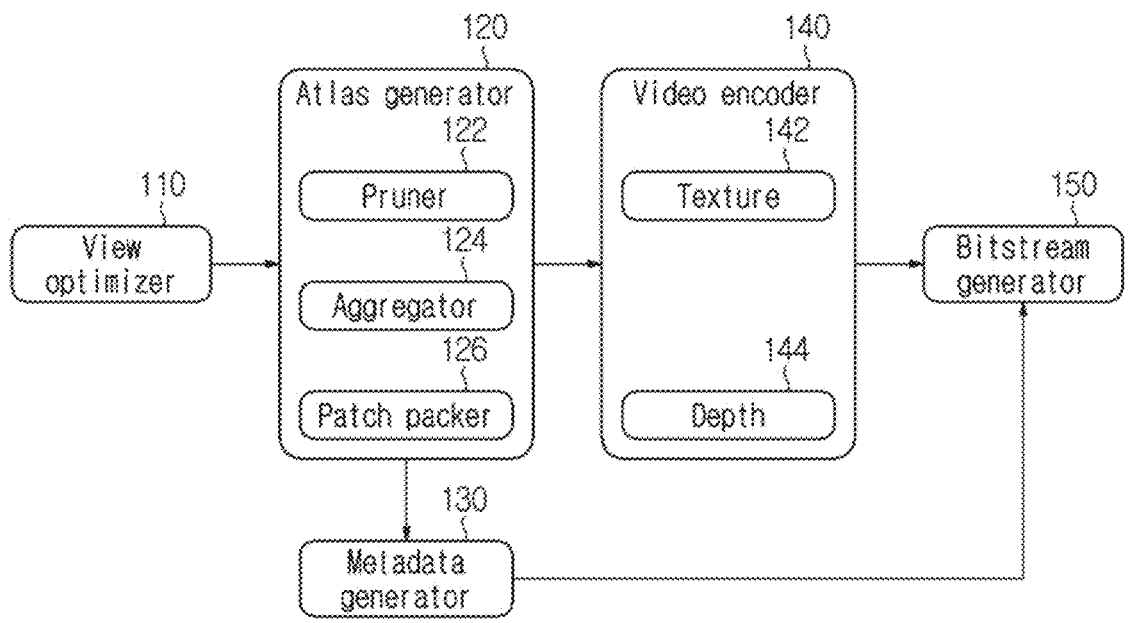
FIG. 1 is a block diagram of an immersive video processing apparatus according to an embodiment of the present disclosure.

A variety of modifications may be made to the present disclosure and there are various embodiments of the present disclosure, examples of which will now be provided with reference to drawings and described in detail. However, the present disclosure is not limited thereto, although the exemplary embodiments can be construed as including all modifications, equivalents, or substitutes in a technical concept and a technical scope of the present disclosure. The similar reference numerals refer to the same or similar functions in various aspects. In the drawings, the shapes and dimensions of elements may be exaggerated for clarity. In the following detailed description of the present invention, references are made to the accompanying drawings that show, by way of illustration, specific embodiments in which the invention may be practiced. These embodiments are described in sufficient detail to enable those skilled in the art to implement the present disclosure. It should be understood that various embodiments of the present disclosure, although different, are not necessarily mutually exclusive. For example, specific features, structures, and characteristics described herein, in connection with one embodiment, may be implemented within other embodiments without departing from the spirit and scope of the present disclosure. In addition, it should be understood that the location or arrangement of individual elements within each disclosed embodiment may be modified without departing from the spirit and scope of the embodiment. The following detailed description is, therefore, not to be taken in a limiting sense, and the scope of the exemplary embodiments is defined only by the appended claims, appropriately interpreted, along with the full range of equivalents to what the claims claim.

Terms used in the present disclosure, 'first', 'second', etc. may be used to describe various components, but the components are not to be construed as being limited to the terms. The terms are only used to differentiate one component from other components. For example, the 'first' component may be named the 'second' component without departing from the scope of the present disclosure, and the 'second' component may also be similarly named the 'first' component. The term 'and/or' includes a combination of a plurality of relevant items or any one of a plurality of relevant terms.

When an element is simply referred to as being 'connected to' or 'coupled to' another element in the present disclosure, it should be understood that the former element is directly connected to or directly coupled to the latter element or the former element is connected to or coupled to the latter element, having yet another element intervening therebetween. In contrast, when an element is referred to as being "directly coupled" or "directly connected" to another element, it should be understood that there is no intervening element therebetween.

Furthermore, constitutional parts shown in the embodiments of the present disclosure are independently shown so as to represent characteristic functions different from each other. Thus, it does not mean that each constitutional part is constituted in a constitutional unit of separated hardware or software. In other words, each constitutional part includes each of enumerated constitutional parts for better understanding and ease of description. Thus, at least two constitutional parts of each constitutional part may be combined to form one constitutional part or one constitutional part may be divided into a plurality of constitutional parts to perform each function. Both an embodiment where each constitutional part is combined and another embodiment where one constitutional part is divided are also included in the scope of the present disclosure, if not departing from the essence of the present disclosure.

The terms used in the present disclosure are merely used to describe particular embodiments, while not being intended to limit the present disclosure. Singular expressions include plural expressions unless the context clearly indicates otherwise. In the present disclosure, it is to be understood that terms such as "including", "having", etc. are intended to indicate the existence of the features, numbers, steps, actions, elements, parts, or combinations thereof disclosed in the specification, and are not intended to preclude the possibility that one or more other features, numbers, steps, actions, elements, parts, or combinations thereof may exist or may be added. In other words, when a specific element is referred to as being "included", other elements than the corresponding element are not excluded, but additional elements may be included in the embodiments of the present disclosure or the technical scope of the present disclosure.

In addition, some of constituents may not be indispensable constituents performing essential functions of the present disclosure but be selective constituents improving only performance thereof. The present disclosure may be implemented by including only the indispensable constitutional parts for implementing the essence of the present disclosure except the constituents used in improving performance. The structure including only the indispensable constituents except the selective constituents used in improving only performance is also included in the scope of the present disclosure.

Hereinafter, embodiments of the present disclosure will be described in detail with reference to the accompanying drawings. In describing exemplary embodiments of the present specification, well-known functions or constructions will not be described in detail since they may unnecessarily obscure the understanding of the present disclosure. The same constituent elements in the drawings are denoted by the same reference numerals, and a repeated description of the same elements will be omitted.

An immersive video means a video that enables a viewport to dynamically change when a viewing position of a user changes. A plurality of input videos is required to realize an immersive video. Each of the plurality of input videos may be referred to as a source video or a source view.

Immersive videos may be classified into such types as 3DoF (Degree of Freedom), 3DoF+, Windowed-6DoF and 6DoF. A 3DoF immersive video may be realized by using only a texture video. On the other hand, not only a texture video but also a depth video is required to render an immersive video including depth information like 3DoF+ 6DoF.

It is assumed that the embodiments described below are directed to process an immersive video including depth information like 3DoF+ and/or 6DoF. Also, a source video is assumed to consist of a texture video and a depth video.

FIG. 1 is a block diagram of an immersive video processing apparatus according to an embodiment of the present disclosure.

Referring to FIG. 1, an immersive video processing apparatus according to the present disclosure may include a view optimizer 110, an atlas generator 120, a metadata generator 130, a video encoder 140, and a bitstream generator 150.

The view optimizer 110 classifies source videos into basic videos and additional videos. A basic video is a source video with the highest pruning priority, and an additional video is a source video with lower pruning priority than the basic video.

The view optimizer 110 may determine at least one of the source videos as a basic video. A source video that is not selected as a basic video may be classified as an additional video.

The view optimizer 110 may determine a basic video by considering the view position of a source video. For example, among a plurality of videos, a source video with the view position at its center may be selected as a basic video.

Alternatively, the view optimizer 110 may determine a basic video based on a camera parameter. Specifically, the view optimizer 110 may determine a basic video based on at least one of a camera index, an order of priority among cameras, a camera position, and whether or not a camera is a ROI camera.

For example, at least one of the following videos may be determined as a basic view video: a source video with a smallest camera index, a source video with a largest camera index, a source index having a same camera index as a predefined value, a source video taken through a camera with highest priority, a source video taken through a camera with lowest priority, a source video taken through a camera at a predefined position (for example, at a center position), and a source video taken through a ROI camera.

Alternatively, the view optimizer 110 may determine a basic video based on the qualities of source videos. For example, a source video with highest quality among source videos may be determined as a basic video.

Alternatively, the view optimizer 110 may examine a degree of data redundancy among source videos and then determine a basic video by considering a proportion of redundant data with other source videos. For example, a source video with a highest or lowest proportion of redundant data with other source videos may be determined as a basic video.

A plurality of source videos may be set as basic videos.

The atlas generator 120 generates a patch video by performing pruning. In addition, the atlas generator 120 extracts a patch from the patch video and generates an atlas by combining a basic video and/or the extracted patch.

An atlas thus generated may consist of a texture atlas and a depth atlas. A texture atlas represents a video combining a basic texture video and/or texture patches, and a depth atlas represents a video combining a basic depth video and/or depth patches.

The atlas generator 120 may include a pruning unit (pruner) 122, an aggregation unit (aggregator) 124 and a patch packing unit (patch packer) 126.

The pruning unit 122 performs pruning for an additional video based on a priority order of pruning. Particularly, the pruning unit 122 may perform pruning for an additional video by using a reference video that has higher pruning priority than the additional video.

A reference video includes a basic video. In addition, according to the pruning priority of an additional video, a reference video may further include another additional video.

It may be selectively determined whether or not an additional video is capable of being used as an additional video. For example, when an additional video is set not to be used as a reference video, only a basic video may be set as a reference video.

On the other hand, when it is set that an additional video is capable of being used as a reference video, an additional video that has higher pruning priority than a basic video and another additional video may be set as a reference video.

Through a pruning process, redundant data between an additional video and a reference video may be removed. When redundant data thus detected are removed from an additional video, a patch video with redundant data between the additional video and a reference video being removed may be generated.

Detection of redundant data may be performed by comparing depth videos. Specifically, depth information is compared between corresponding positions of an additional depth video and a reference depth video respectively. When a difference is equal to or less than a threshold, a corresponding position may detect redundant data between an additional depth video and a reference depth video.

A patch video includes a valid region and/or an invalid region. A valid region means a region excluding an overlapping region between an additional video and a reference video. In other words, a valid region is a region including data that are included in an additional video but not in a reference video. An invalid region means a region where an overlapping region between an additional video and a reference video is removed. A pixel/data included in a valid region may be referred to as a valid pixel/valid data, and a pixel/data included in an invalid region may be referred to as an invalid pixel/invalid data.

The aggregation unit 124 extracts a patch from a patch video. Specifically, it may extract a rectangular region including valid data in a patch video as a patch. As a patch is extracted in a rectangular shape irrespective of a shape of a valid region, a patch extracted from a non-rectangular valid region may include not only valid data but also invalid data.

The aggregation unit 124 may group patches that are extracted from at least one patch video.

As for a source video that is not pruned (unpruned source video), the entire video may be extracted as one patch. Specifically, an entire 2D video, which develops an unpruned source video in a predetermined projection format, may be set as a single patch. A projection format may include at least one of an equirectangular projection format (ERP), a cube map, and a perspective projection format.

Herein, an unpruned source video means a basic video with highest pruning priority. Alternatively, an additional video without redundant data with a basic video and a reference video may be defined as an unpruned source video.

Depending on whether or not pruning is performed for a source video, patches may be classified as complete video patches or segment video patches. A complete video patch represents a patch that is extracted from an unpruned source video. In other words, a complete video patch may represent a patch of a basic video or a patch of an unpruned additional video. A segment video patch represents a patch that is extracted from a pruned additional video. In other words, a segment video patch may represent a patch that is extracted from a patch video with redundant data being removed.

The packing unit 126 may pack each of patches that are clustering on a rectangular video. Packing may be accompanied by transformation like scaling, rotation and flip of a patch. A video where patches are packed may be defined as an atlas.

Specifically, the packing unit 126 may generate a texture atlas by packing a basic texture video and/or texture patches and generate a depth atlas by packing a basic depth video and/or depth patches.

A complete video patch and a segment video patch may be set to be allocated in different atlases. Alternatively, an atlas may be constructed by mixing a complete video patch and a segment video patch.

When an atlas includes a complete video patch for a specific source video, it means that the atlas includes all the data of the specific source video.

Figure 2A:
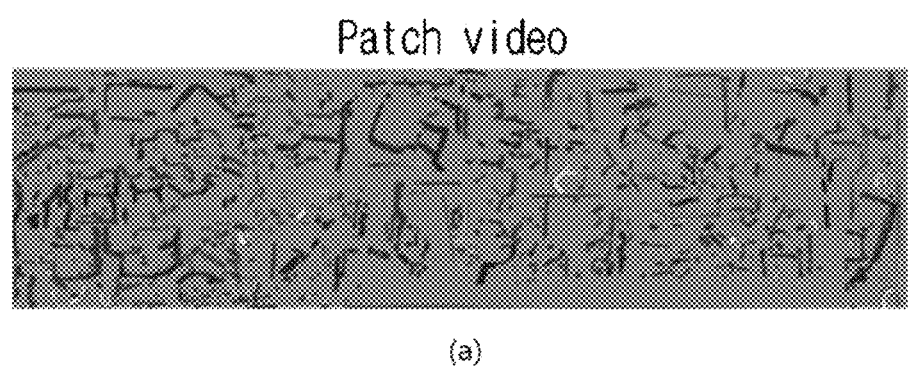
FIGS. 2A and 2B show an example of generating an atlas by packing patches included in a patch video.
Figure 2B:
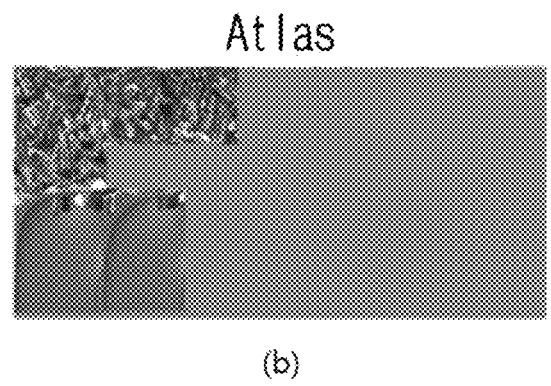

FIGS. 2A and 2B show an example of generating an atlas by packing patches included in a patch video.

FIG. 2A shows a patch video, and FIG. 2B shows an atlas where patches are packed.

The number of atlases generated by the atlas generator 120 may be determined based on at least one of the arrangement of camera rigs, the accuracy of a depth map, and the number of source videos.

The metadata generator 130 generates metadata for view video synthesis. Metadata may include at least one of camera-related data, pruning-related data, atlas-related data and patch-related data.

Pruning-related data include information for determining a priority order of pruning among source videos. For example, at least one of a flag indicating whether or not a source video is a root node and a flag indicating whether or not a source video is a leaf node may be encoded. A root node represents a source video with highest pruning priority (that is, basic video), and a leaf node represents a source video with lowest pruning priority.

When a source video is not a root node, a parent node index may be additionally encoded. A parent node index may represent a video index of a source video that is a parent node.

Alternatively, when a source video is not a leaf node, a child node index may be additionally encoded. A child node index may represent a video index of a source video that is a child node.

Atlas-related data may include at least one of information on the number of atlases, information on a priority order among atlases, a flag indicating whether or not an atlas includes a complete video, and information related to scaling of an atlas.

Patch-related data include a position and/or size of a patch in an atlas video, a source video to which a patch belongs, and information for specifying a position and/or size of a patch in a source video. For example, at least one of positional information indicating a position of a patch in an atlas video and size information indicating a size of a patch in an atlas video may be encoded. In addition, a source index for identifying a source video, from which a patch originates, may be encoded. A source index represents an index of a source video that is an original source of a patch. In addition, positional information indicating a position corresponding to a patch in a source video or size information indicating a size corresponding to a patch in a source video may be encoded.

The video encoder 140 encodes an atlas. The video encoder 140 may include a texture video encoder 140 for encoding a texture atlas and a depth video encoder 144 for encoding a depth atlas.

The bitstream generator 150 generates a bitstream based on encoded video data and metadata. A bitstream thus generated may be transmitted to an immersive video output apparatus.

Figure 3:
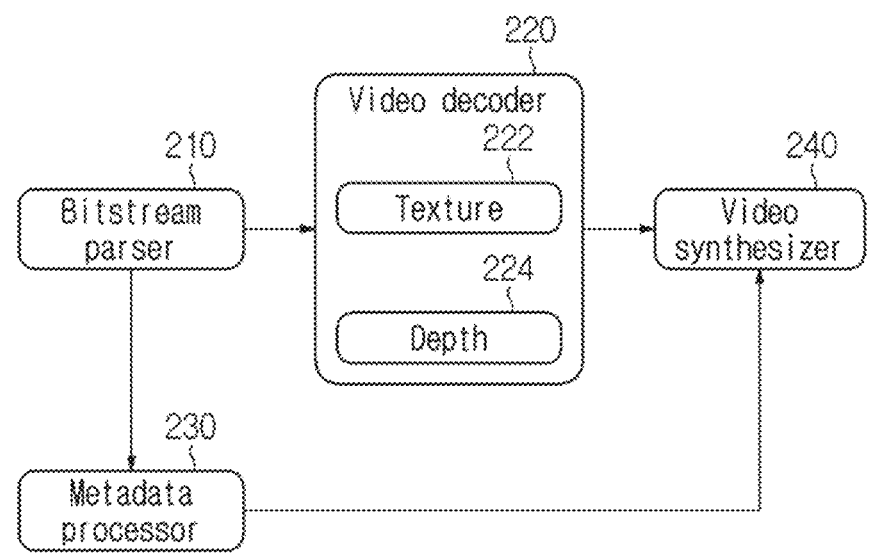
FIG. 3 is a block diagram of an immersive video output apparatus according to an embodiment of the present disclosure.

FIG. 3 is a block diagram of an immersive video output apparatus according to an embodiment of the present disclosure.

Referring to FIG. 3, an immersive video output apparatus according to the present disclosure may include a bitstream parsing unit (parser)210, a video decoder 220, a metadata processor 230 and a video synthesizer 240.

The bitstream parsing unit 210 parses video data and metadata from a bitstream. Video data may include data of an encoded atlas.

The video decoder 220 decodes parsed video data. The video decoder 220 may include a texture video decoder 222 for decoding a texture atlas and a depth video decoder 224 for decoding a depth atlas.

The metadata processor 230 unformats parsed metadata. Unformatted metadata may be used to synthesize a view video. For example, when a user's movement information is input into an immersive video output apparatus, the metadata processor 230 may determine an atlas necessary for video synthesis, patches necessary for video synthesis and/or the positions/sizes of the patches in an atlas in order to reproduce a viewport video according to the user's movement.

The video synthesizer 240 may dynamically synthesize a viewport video according to a user's movement. Specifically, the video synthesizer 240 may extract patches necessary to synthesize a viewport video from an atlas by using information that is determined according to a user's movement in the metadata processor 230. Specifically, a viewport video may be generated by extracting patches from an atlas including information on a source video necessary for synthesizing the viewport video and the source video within the atlas and by synthesizing the extracted patches.

Figure 4:
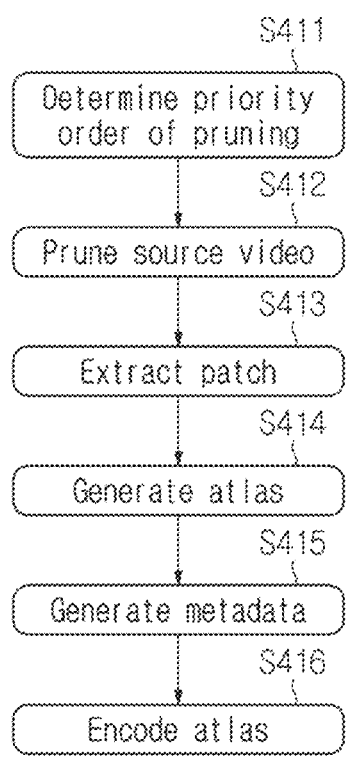
FIG. 4 and FIG. 5 illustrate flow charts of an immersive video processing method and an immersive video outputting method respectively.
Figure 5:
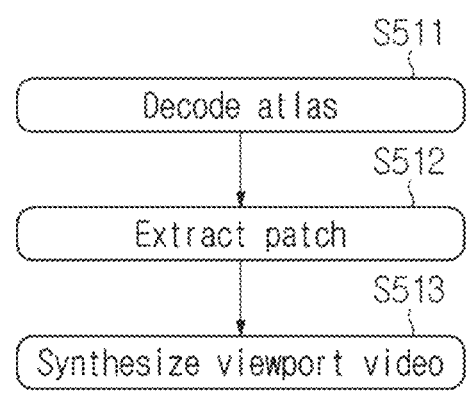

FIGS. 4 and FIG. 5 illustrate flow charts of an immersive video processing method and an immersive video outputting method respectively. It is also possible to process or output an immersive video in a different order from the order described in FIG. 4 and FIG. 5.

An immersive video processing apparatus may determine a priority order of pruning for source videos (S411). Specifically, a priority order of pruning may be set by classifying source videos as basic and additional videos.

Then, based on the priority order of pruning, pruning may be performed for the source videos (S412), and a patch may be extracted from a patch video that is generated as a result of pruning (S413). As for a source video that is not pruned (for example, a basic video), the entire video may be extracted as one patch.

Then, an atlas may be generated by combining extracted patches (S414), and the information of the generated atlas and that of patches included in the atlas may be generated as metadata (S415).

The atlas may be encoded (S416), and the metadata and the encoded atlas may be transmitted to an immersive video output apparatus.

An immersive video output apparatus may extract atlas data by parsing a bitstream, which is received from an immersive video processing apparatus, and decode an atlas based on extracted data (S511).

In addition, when a user's movement occurs, an atlas required for synthesizing a viewport video according to the user's movement may be determined based on metadata, and patches included in the atlas may be extracted (S512).

When patches are extracted, a viewport video may be generated by synthesizing the extracted patches (S513). Herein, in order to synthesize generated patches, size/position information of each patch and a camera parameter may be used.

Based on the above description, a video processing method proposed by the present disclosure will be described in further detail.

Redundant data between an additional video and a basic video and/or redundant data between additional videos may be hierarchically removed through pruning. Herein, a shape of a patch that is finally output may be different according to a priority order of pruning. For example, as the pruning priority is higher, there remains more information on an additional video (for example, a large patch).

Figure 6:
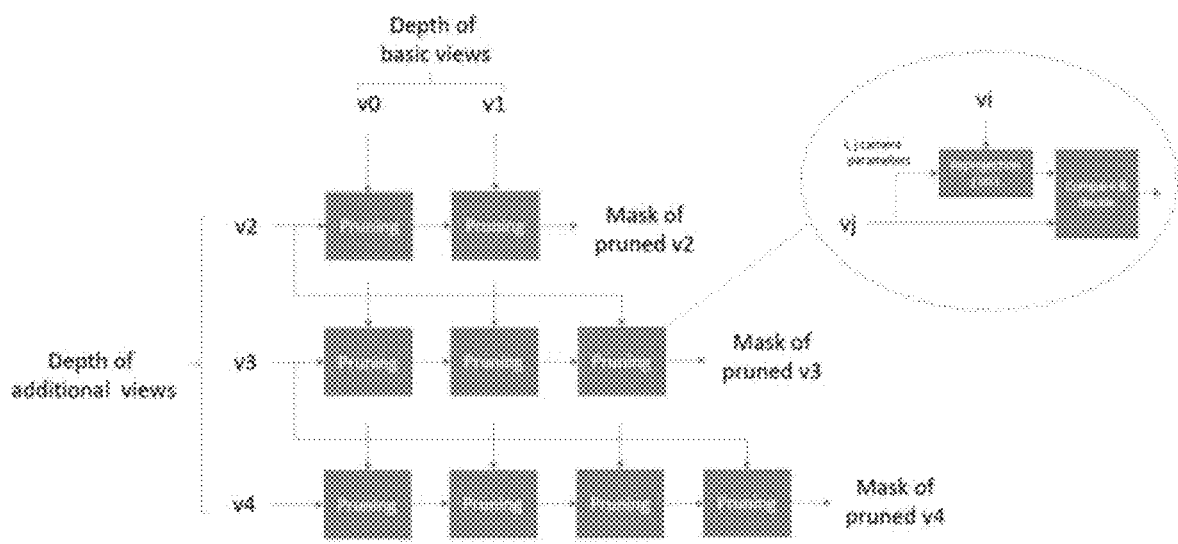
FIG. 6 and FIG. 7 show examples where a priority order of pruning is differently set among source videos.

Referring to FIG. 6, when a priority order of pruning is set as shown in FIG. 6, information of the additional video v2 with highest pruning priority among additional videos is preserved most, and information of the additional video v4 with lowest pruning priority is preserved least.

Figure 7:
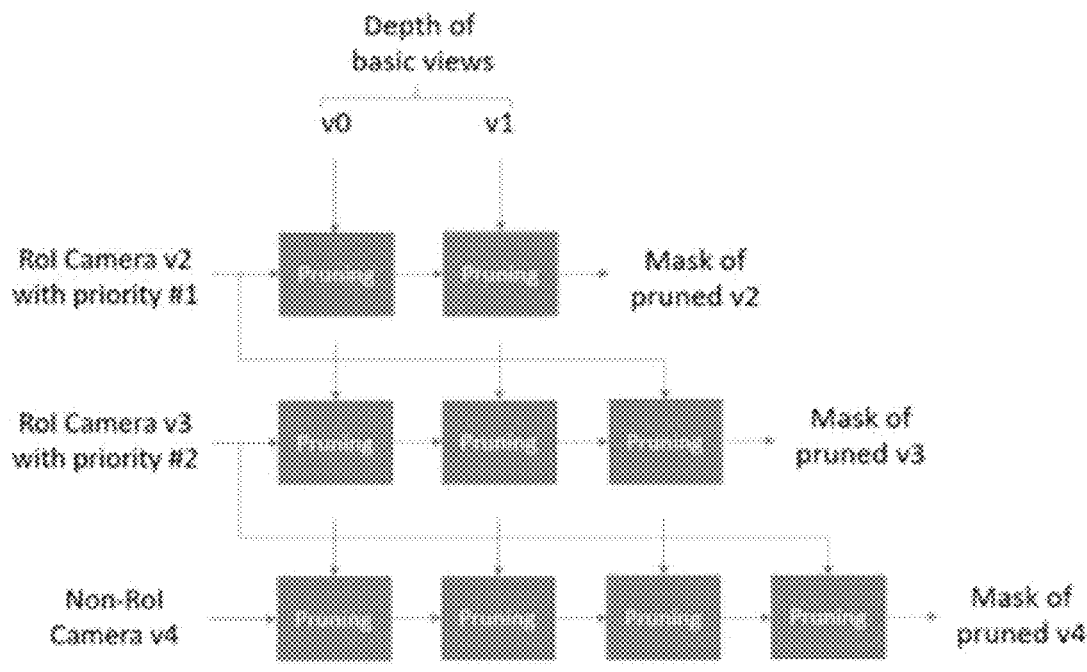

Based on the above feature, the viewing quality of each region may be controlled. For example, in order to improve the view quality of a region of interest (ROI), the pruning priority of a ROI camera may be set to be high. For example, as shown in FIG. 7, when the pruning priority of the additional videos v2 and v3, which are taken through ROI cameras, is set to be higher than that of the additional video v4 taken through non-ROI cameras, information on the additional videos v2 and v3 that are taken through ROI cameras is preserved more than information on the additional video v4 that is taken through non-ROI cameras. Thus, when synthesizing a video including a region of interest, viewing quality may be improved.

An immersive video processing apparatus may determine a priority order of pruning based on whether or not a source video is a ROI video. A ROI video may mean a source video including a region of interest, a source video taken through a ROI camera, or an unpruned source video. For example, a source video that is a ROI video may be set to have higher pruning priority than a source video that is not a ROI video.

Information on a ROI may be encoded and transmitted as metadata. Information on a ROI may indicate whether or not a source video is a ROI video.

An immersive video processing apparatus may generate a plurality of atlases. An immersive video output apparatus may decode a plurality of atlases and synthesize a video corresponding to a viewport.

Herein, when the number of video decoders included in an immersive video output apparatus is less than the number of atlas videos, it is impossible to decode all the atlases.

Accordingly, the present disclosure suggests that a priority order is set among atlases and then a priority order of decoding is determined according the set priority order. Specifically, when the number of atlases is M and the number of video decoders is N, top N videos according to a priority order among M atlases may be decoded through a video decoder.

Figure 8:
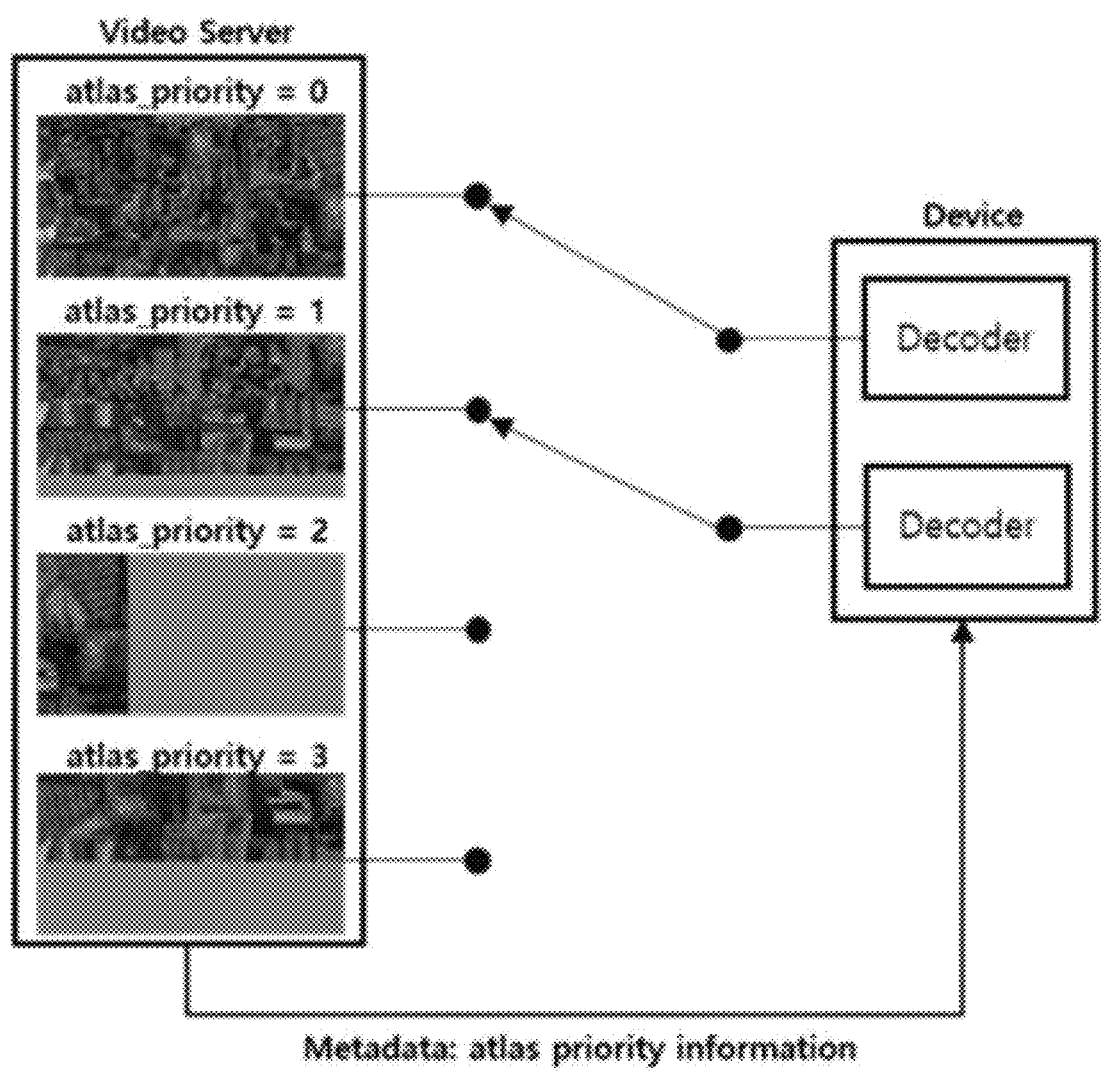
FIG. 8 shows an example of selecting a decoding target based on a priority order among atlases.

FIG. 8 shows an example of selecting a decoding target based on a priority order among atlases.

As in the example illustrated in FIG. 8, when an immersive video output apparatus includes two video decoders, only top two atlases in a priority order may be selected as decoding targets.

A priority order among atlases may be determined based on whether or not an atlas includes information on a ROI video. Specifically, an atlas including a patch derived from a ROI video (hereinafter, referred to as a ROI patch) may be set to have higher priority than other atlases. When ROI patches are dispersedly stored in a plurality of atlases, a priority order among atlases may be determined based on the number of ROI patches included in each atlas. Specifically, when the number of ROI patches included in a first atlas is larger than that of ROI patches included in a second atlas, the first atlas may be set to have higher priority than the second atlas.

In addition, an atlas including a complete video patch may be set to have higher priority than an atlas including only segment video patches.

Information on atlas priority may be encoded/decoded as metadata. For example, Table 1 is a table including information on atlas priority.

TABLE 1

|  | Descriptor |
|---|---|
| atlas_params_list( ) { | |
|     num_atlases_minus1 | u(8) |
|     for ( i = 0; i <= num_atlases_minus1; i++ ) { | |
|         atlas_id[ i ]; | u(8) |
|         atlas_priority[ i ]; | u(8) |
|         atlas_params( atlas_id[ i ] ) | |
|     } | |
| } | |

In Table 1, the syntax num_atlases_minus1 is used to determine the number of atlases. Specifically, the syntax num_atlases_minus1 may represent a value that is obtained by subtracting 1 from a total number of atlases.

The syntax atlas_id[i] represents an identifier or index allocated to the i-th atlas.

The syntax atlas_priority[i] represents a priority of the i-th atlas. As atlas_priority[i] has a lower value, an atlas has a higher priority.

When an immersive video processing apparatus is not equipped with a sufficient number of video decoders for decoding every atlas, a decoding target may be selected with reference to a priority of each atlas.

As another example, a flag indicating whether or not an atlas includes a ROI patch may be encoded/decoded. For example, the flag atlas_ROI_flag[i], which indicates whether or not the i-th atlas includes a ROI patch, may be encoded.

When an immersive video processing apparatus is not equipped with a sufficient number of video decoders for decoding every atlas, an atlas including a ROI patch may be decoded in preference to an atlas that does not include a ROI patch.

When ROI patches are distributed in a plurality of atlases, a ROI patch included in an atlas with low priority may not be decoded depending on the number of video decoders included in an atlas video output apparatus. In this case, a problem occurs which degrades synthesis quality of a ROI video.

In order to solve the problem, an immersive video processing apparatus may be set to arrange ROI patches in one atlas. When it is not possible to arrange all the ROI patches in one atlas, some ROI patches may be arranged in the atlas, and the remaining ROI patches may be arranged in a next atlas.

As another example, ROI patches may be arranged in a specific region of an atlas. For example, when an atlas is divided into a plurality of tiles, ROI patches may be set to be concentrated in a specific tile. In this case, when region-based transmission is activated in a tiled video, it is possible to transmit only a tile including ROI patches.

Figure 9:
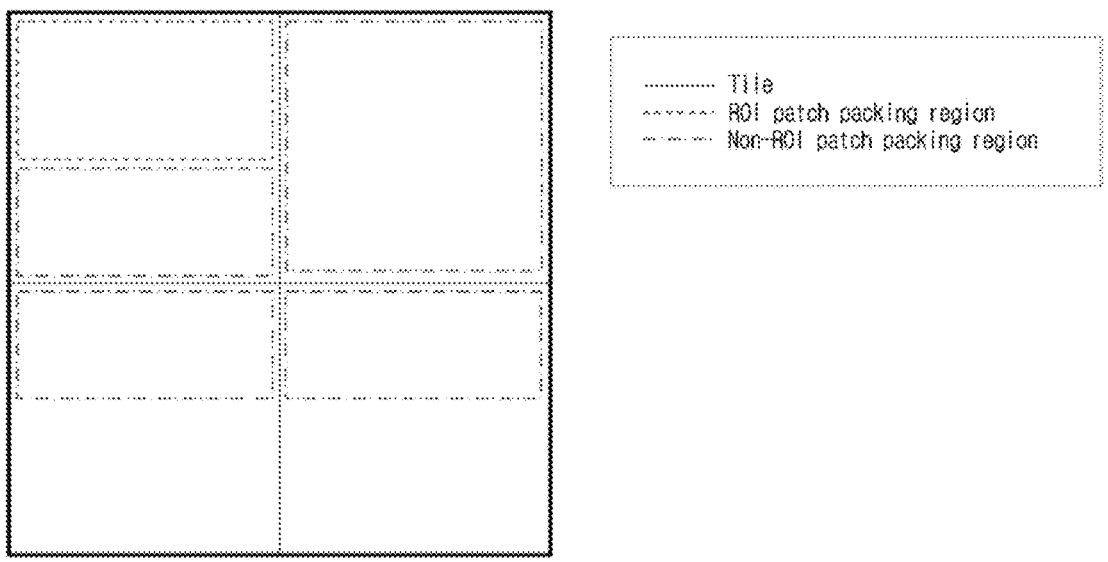
FIG. 9 shows an example of concentrating ROI (Region of Interest) patches in a specific tile.

FIG. 9 shows an example of concentrating ROI (Region of Interest) patches in a specific tile.

As in the example illustrated in FIG. 9, when an atlas consists of four tiles, ROI patches may be arranged only in a first tile among the four tiles.

After ROI patches are arranged in the first tile, non-ROI patches may be arranged in the remaining tiles.

Alternatively, when it is not possible to arrange all the ROI patches in one tile, after ROI patches are arranged in a first tile, the remaining ROI patches may be arranged in a second tile.

Information on a region including ROI patches within an atlas video may be encoded/decoded as metadata. The information may include at least one of the positional information and size information of a region including ROI patches.

For example, Table 2 is a syntax table including the size information of a region including ROI patches.

TABLE 2

|  | Descriptor |
|---|---|
| atlas_params_list( ) { | |
|   num_atlases_minus1 | u(8) |
|   for ( i = 0; i <= num_atlases_minus1; i++ ) { | |
|     atlas_id[ i ]; | u(8) |
|     region_width_in_atlas[ i ]; | u(8) |
|     region_height_in_atlas[ i ]; | u(8) |
|     atlas_params( atlas_id[ i ] ) | |
|   } | |
| } | |

In Table 2, the syntax region_width_in_atlas[i] represents the width of a region including ROI patches within the i-th atlas.

The syntax region_height_in_atlas[i] represents the height of a region including ROI patches within the i-th atlas.

Table 3 is a syntax table including positional information of a region including ROI patches.

TABLE 3

|  | Descriptor |
|---|---|
| atlas_params_list( ) { | |
|   num_atlases_minus1 | u(8) |
|   for ( i = 0; i <= num_atlases_minus1; i++ ) { | |
|     atlas_id[ i ]; | u(8) |
|     region_pos_in_atlas_x[ i ]; | u(8) |
|     region_pos_in_atlas_y[ i ]; | u(8) |
|     atlas_params( atlas_id[ i ] ) | |
|   } | |
| } | |

In Table 3, the syntax region_pos_in_atlas_x[i] represents the x-coordinate of a region including ROI patches within the i-th atlas.

The syntax region_pos_in_atlas_y[i] represents the y-coordinate of a region including ROI patches within the i-th atlas.

The syntax region_pos_in_atlas_x[i] and the syntax region_pos_in_atlas_y[i] may represent an upper-left coordinate or a center coordinate of a region including ROI patches.

Both information indicating a size of region including ROI patches and information indicating a position of region including ROI patches may be encoded/decoded by combining embodiments illustrated in Table 2 and Table 3.

When a complete video patch and a segment video patch are mixed within an atlas, the complete video patch may be set as a ROI patch. In this case, the syntaxes illustrated in Table 2 and Table 3 may represent a size and a position of a complete video patch within an atlas.

Information indicating whether or not an atlas video includes an unpruned source video (for example, a basic video) may be encoded/decoded as metadata. For example, a flag indicating whether or not an atlas video includes an unpruned source video may be encoded/decoded. For example, Table 4 is a syntax table including the flag.

TABLE 4

|  | Descriptor |
|---|---|
| atlas_params_list( ) { | |
|   num_atlases_minus1 | u(8) |
|   for ( i = 0; i <= num_atlases_minus1; i++ ) { | |
|     atlas_id[ i ]; | u(8) |
|     basic_atlas_flag; | u(1) |
|     atlas_params( atlas_id[ i ] ) | |
|   } | |
| } | |

In Table 4, the syntax basic_atlas_flag[i] indicates whether or not the i-th atlas includes an unpruned source video (for example, a basic video). An unpruned source video is included in an atlas as one complete video patch. Accordingly, the syntax basic_atlas_flag[i] may indicate whether or not the i-th atlas includes a complete video patch.

When the syntax basic_atlas_flag[i] is 1, it represents that the i-th atlas consists only of a complete video patch (that is, a basic video) or a mixture of a complete video patch and a segment video patch.

On the other hand, when the syntax basic_atlas_flag[i] is 0, it represents that the i-th atlas does not include a complete video patch. In other words, when the syntax basic_atlas_flag[i] is 0, it represents that the i-th atlas consists only of segment video patches.

Like a basic video, data for fully rendering a specific view are required in order to synthesize a viewport video. In order to identify an atlas necessary for view rendering, an identifier for an atlas, among a plurality of atlases, which includes a complete video patch for a basic video or an unpruned additional video, may be set as a predefined value. Here, the predefined value may be 0 or a value obtained by subtracting 1 from the number of atlases. Thus, based on an atlas identifier, it may be determined whether or not an atlas includes a complete video patch.

For example, atlas_id, that is, an identifier of an atlas including a complete video patch for a basic video may be set to 0. Atlases of which the identifier atlas_id[i] is not 0 may be understood not to include a basic video.

Whether or not a complete video patch is included in the i-th atlas may be determined by considering the syntax atlas_id[i] and the syntax basic_atlas_flag[i].

For example, when the syntax atlas_id[i] has a predefined value (for example, 0), it may be determined that the i-th atlas includes a complete video patch (for example, a basic video). For an atlas of which an identifier has a predefined value, encoding of the syntax basic_atlas_flag[i] may be skipped, and the value may be considered to be 1.

On the other hand, for an atlas of which an identifier does not have a predefined value, the syntax basic_atlas_flag[i] may be additionally encoded. When an identifier does not have a predefined value and the syntax basic_atlas_flag[i] is 0, it may be determined that a corresponding atlas video does not include a complete video patch.

Information indicating an atlas type may be included in metadata. An atlas type represents one of a main atlas and a supplementary atlas.

According to an atlas type, at least one of the following pieces of information may be determined: whether or not an atlas includes information on a basic video, whether or not an atlas includes a complete video patch, whether or not an atlas includes information on an additional video, whether or not an atlas includes depth information of a basic video, whether or not an atlas includes depth information of an additional video, and whether or not an atlas includes necessary information for view rendering.

For example, an atlas including information on a basic video, an atlas including depth information of a basic video, or an atlas including necessary information for view rendering may be set as a main atlas.

Table 5 is a syntax table including information related to an atlas type.

TABLE 5

|  | Descriptor |
|---|---|
| atlas_params_list( ) { |  |
|     num_atlases_minus1 | u(8) |
|     for ( i = 0; i <= num_atlases_minus1; i++ ) { |  |
|         atlas_id[ i ]; | u(8) |
|         atlas_type | u(3) |
|         atlas_parmas( atlas_id[ i ] ) |  |
|     } |  |
| } |  |

The syntax atlas_type [i] indicates whether an atlas is a main atlas or a supplementary atlas.

For example, when the syntax atlas_type has a value of 0, it indicates that an atlas is a main atlas. On the other hand, when the syntax atlas_type has a value of 1, it indicates that an atlas is a supplementary atlas.

Accordingly, when the syntax atlas_type has a value of 0, it indicates that an atlas includes a basic video or at least one patch necessary for view rendering. On the other hand, when the syntax atlas_type has a value of 1, it indicates that an atlas does not include a basic video or patches necessary for view rendering.

For efficient encoding/decoding and transmission of an immersive video, patches derived from a plurality of patch videos may be arranged in one atlas. When packing patches, source information of the patches is required. For example, a source index indicating an index of a source video, from which patches are derived, may be included in metadata.

Figure 10:
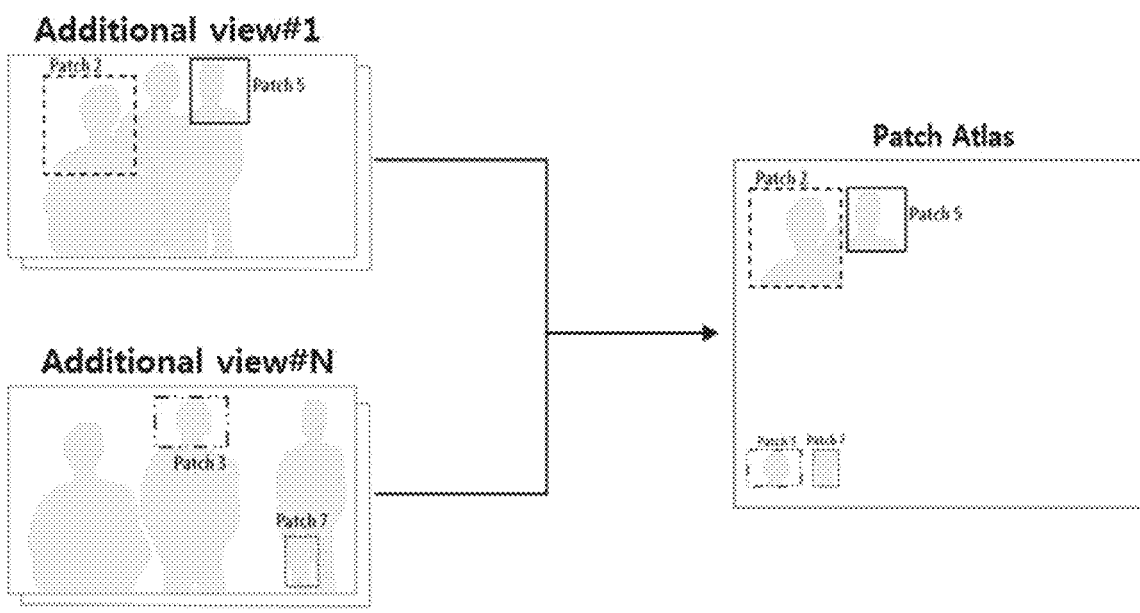
FIG. 10 shows an example where patches derived from a plurality of patch videos are placed in one atlas.

FIG. 10 shows an example where patches derived from a plurality of patch videos are placed in one atlas.

In the example illustrated in FIG. 10, Patch 2 and Patch 5, which are derived from the additional video 1 with index 1, and Patch 3 and Patch 7, which are derived from the additional video 2 with index 2, may be packed in one atlas.

For view rendering, information on a source video, from which a patch is derived, may be included in metadata. For example, since Patch 2 and Patch 5 are derived from a source video with index 1 (that is, the additional video 1), the source index of Patch 2 and Patch 5 may be set to 1. On the other hand, since Patch 3 and Patch 7 are derived from a source video with index 2 (that is, the additional video 2), the source index of Patch 3 and Patch 7 may be set to 2.

A source index of each patch may be included in metadata. However, as patches derived from a same additional video have a same source index, encoding the source index of the patches may decrease encoding/decoding efficiency because the same value is repeatedly encoded/decoded.

In order to solve the problem, a flag indicating whether or not a patch has a same source index as a previous patch may be encoded/decoded. According to a value of the flag, it may be determined whether or not to additionally encode/decode a source index of a patch. For example, Table 6 and Table 7 are syntax tables including the flag.

TABLE 6

|  | Descriptor |
|---|---|
| atlas_params( a ) { |  |
|     num_patches_minus1[ a ] | u(16) |
|     atlas_width[ a ] | u(16) |
|     atlas_height[ a ] | u(16) |
|     for ( i = 0; i <= num_patches_minus1; i++ ) { |  |
|         view_id_equal_flag | u(1) |
|         if(view_id_equal_flag==0) { |  |
|             view_id[ a ][ i ] | u(v) |
|         } |  |
|         patch_id[a][i] | u(v) |
|         patch_width_in_view[ a ][ i ] | u(v) |
|         patch_height_in_view[ a ][ i ] | u(v) |
|         patch_pos_in_atlas_x[ a ][ i ] | u(v) |
|         patch_pos_in_atlas_y[ a ][ i ] | u(v) |
|         patch_pos_in_view_x[ a ][ i ] | u(v) |
|         patch_pos_in_view_y[ a ][ i ] | u(v) |
|         patch_rotation[ a ][ i ] | u(3) |
|     } |  |
| } |  |

TABLE 7

|  | Descriptor |
|---|---|
| atlas_params( a ) { |  |
|     num_patches_minus1[ a ] | u(16) |
|     atlas_width[ a ] | u(16) |
|     atlas_height[ a ] | u(16) |
|     for ( i = 0; i <= num_patches_minus1; i++ ) { |  |
|         previous_view_id_equal_flag | u(1) |
|         if(previous_view_id_equal_flag==0) { |  |
|             view_id[ a ][ i ] | u(v) |

TABLE 7-continued

| | Descriptor |
|---|---|
| } | |
| patch_id[a][i] | u(v) |
| patch_width_in_view[ a ][ i ] | u(v) |
| patch_height_in_view[ a ][ i ] | u(v) |
| patch_pos_in_atlas_x[ a ][ i ] | u(v) |
| patch_pos_in_atlas_y[ a ][ i ] | u(v) |
| patch_pos_in_view_x[ a ][ i ] | u(v) |
| patch_pos_in_view_y[ a ][ i ] | u(v) |
| patch_rotation[ a ][ i ] | u(3) |
| } | |
| } | |

In Table 6, the syntax num_patches_minus1[a] is used to determine the number of patches included in an atlas with index a. For example, the syntax num_patches_minus1[a] may be a value obtained by subtracting 1 from a total number of patches included in an atlas with index a.

The syntax atlas_width [a] and the syntax atlas_height [a] may represent the width and height of an atlas with index a respectively.

The syntax view_id_equal_flag [a] [i] indicates whether or not a source index of the i-th patch is equal to a source index of a previous patch (that is, the (i-1)th patch). For a first patch within an atlas (a patch of which i is 0), encoding/decoding of the syntax view_id_equal_flag[a][i] may be skipped. When encoding/decoding of the syntax view_id_equal_flag[a][i] is skipped, the value may be considered as 0.

When the syntax view_id_equal_flag[i] has a value of 0, it indicates that a source index of the i-th patch is different from a source index of a previous patch. When a source index of the i-th patch is different from a source index of a previous patch, the syntax view_id[a][i] indicating the source index of the i-th patch may be additionally encoded/decoded.

On the other hand, when a source index of the i-th patch is equal to a source index of a previous patch, encoding/decoding of the syntax view_id[a][i], which indicates the source index of the i-th patch, may be skipped. When encoding/decoding of the syntax view_id[a] [i] is skipped, the value may be considered to be equal to a source index of a previous patch (for example, view_id[a] [i−1]).

When using the syntax view_id_equal_flag[a][i], a source index may be encoded/decoded only for a patch with view_id_equal_flag of 0, and encoding/decoding of a source index may be skipped for a patch with view_id_equal_flag of 1. In other words, the memory efficiency may be improved and the analysis time of patches may be reduced by parsing the syntax view_id only when the view_id_equal_flag is 0.

In order to further clarify the meaning of a flag, as in the example shown by Table 7, the flag previous_view_id_equal_flag[a][i] may be used instead of view_id_equal_flag[a][i].

The syntax patch_id[a][i] represents an identifier allocated to the i-th patch. As a unique recognition value given to a patch video, the identifier may represent an association between patches. A plurality of identifiers may be allocated to one patch video.

An association may indicate at least one of whether or not patches are included in a same source video, whether or not patches are included in a same ROI, and whether or not patches are included in a specific object.

A same identifier may be allocated to associated patches. For example, when the patch A and the patch B are similar which are included in an atlas, the identifier patch_id[a] [A] for the patch A and the identifier patch_id[a][B] for the patch B may be set to a same value.

Associated or similar patches may be searched more easily by using the syntax patch_id[a] [i].

The syntax patch_width_in_view[a][i] and the syntax patch_height_in_view[a][i] represent the width and height of the i-th patch within a source view respectively.

The syntax patch_pos_in_atlas_x[a][i] and the syntax patch_pos_in_atlas_y[a][i] represent the x-coordinate and y-coordinate of the i-th patch within an atlas respectively. Coordinates specified by the syntax patch_pos_in_atlas_x [a][i] and the syntax patch_pos_in_atlas_y[a][i] may represent an upper-left position or a center position of the i-th patch.

The syntax patch_pos_in_view_x[a][i] and the syntax patch_pos_in_view_y[a][i] represent the x-coordinate and y-coordinate of a region corresponding to the i-th patch within a source video respectively. Coordinates specified by the syntax patch_pos_in_view_x[a][i] and the syntax patch_pos_in_view_y[a] [i] may represent an upper-left position or a center position of a region corresponding to the i-th patch.

The syntax patch_rotation[a][i] indicates whether or not the i-th patch is rotated. For example, the syntax patch_rotation[a][i] specifies at least one of a direction of rotation of the i-th patch (clockwise or anti-clockwise), a rotation angle, whether or not the i-th patch is flipped left and right, and whether or not the i-th patch is flipped up and down.

Based on the number of patches included in an atlas, it may be determined whether or not the atlas includes a complete video patch. For example, when the number of patches included in an atlas is 1 (for example, the syntax num_patches_minus1 has a value of 0), it may be determined that the atlas includes only a basic video.

However, the number of patches included in an atlas is not sufficient to exactly determine whether or not the atlas includes a complete video patch. For example, when an atlas includes a plurality of patches (for example, a value of the syntax num_patches_minus1 is equal to or greater than 1), the atlas has one of the following configuration states 1) to 3).

1) the atlas consists of a plurality of complete video patches.

2) the atlas consists of one or more complete video patches and one or more segment video patches.

3) the atlas consists of a plurality of segment video patches.

In the case of 1) or 2), even though the atlas includes a complete video patch, the number of patches included in the atlas (that is, the syntax num_patches_minus1) is not sufficient to recognize whether or not the atlas includes a complete video patch.

Accordingly, information indicating whether or not a patch included in the atlas is a complete video patch may be additionally encoded/decoded. For example, Table 8 is a syntax table including a flag indicating whether or not a patch is a complete video patch.

TABLE 8

| | Descriptor |
|---|---|
| atlas_params( a ) { | |
| num_patches_minus1[ a ] | u(16) |
| atlas_width[ a ] | u(16) |
| atlas_height[ a ] | u(16) |

TABLE 8-continued

| | Descriptor |
|---|---|
| for ( i = 0; i <= num_patches_minus1; i++ ) { | |
|     previous_view_id_equal_flag | u(1) |
|     if(previous_view_id_equal_flag==0) { | |
|         view_id[ a ][ i ] | u(v) |
|     } | |
|     patch_id[a][i] | u(v) |
|     basic_patch_flag | u(1) |
|     patch_width_in_view[ a ][ i ] | u(v) |
|     patch_height_in_view[ a ][ i ] | u(v) |
|     patch_pos_in_atlas_x[ a ][ i ] | u(v) |
|     patch_pos_in_atlas_y[ a ][ i ] | u(v) |
|     patch_pos_in_view_x[ a ][ i ] | u(v) |
|     patch_pos_in_view_y[ a ][ i ] | u(v) |
|     patch_rotation[ a ][ i ] | u(3) |
| } | |
| } | |

In Table 8, the syntax basic_patch_flag[a][i] indicates whether or not the i-th patch is a complete video patch. For example, when the value of the syntax basic_patch_flag[a][i] is 1, the i-th patch is a patch of a basic video (that is, a complete video patch). On the other hand, when the value of the syntax basic_patch_flag [a] [i] is 0, the i-th patch is a patch of a pruned additional patch (that is, a segment video patch).

A patch type may be determined based on an identifier of a patch. For example, an identifier of a patch that is derived from a basic video or an unpruned additional video may be set to a predefined value. Here, the predefined value may be 0.

Accordingly, when a value of view_id is 0, it may indicate that a patch is a complete video patch. Accordingly, when view_id has a value greater than 0, it may indicate that a patch is a segment video patch.

When an immersive video processing apparatus generates a plurality of atlases, the amount of data transmission may increase and the decoding capacity of an immersive video output apparatus may increase. In order to solve such a problem of decreasing encoding/decoding efficiency, it may be necessary to reduce the number of generated atlases. Specifically, the number of generated atlases may be reduced by scaling a patch down and packing the downscaled patch into an atlas.

Patch scaling may be applied only to a texture patch. Here, the texture patch is a patch that consists only of texture information of a source video. Alternatively, a depth patch may be scaled with a same factor as a texture patch.

A flag indicating whether or not scaling of a patch is permitted may be encoded/decoded as metadata. For example, Table 9 is a syntax table including the flag.

TABLE 9

| | Descriptor |
|---|---|
| miv_atlas_sequence_params(vuh_atlas_id) { | |
|     masp_texture_patch_scale_enabled_flag | u(1) |
| } | |

In Table 9, the syntax masp_texture_patch_scale_enabled_flag indicates that scaling of a patch is permitted. When the syntax masp_texture_patch_scale_enabled_flag has a value of 1, a syntax for determining a scaling factor of a patch may be additionally encoded/decoded at a lower level. On the other hand, when the syntax masp_texture_patch_scale_enabled_flag has a value of 0, a syntax for determining a scaling factor of a patch is not present at a lower level.

When scaling is permitted only for a texture patch or scaling factors are different between a texture patch and a depth patch, a texture atlas and a depth atlas may have different packing structures. Accordingly, packing structures of a texture atlas and a depth atlas may be individually encoded/decoded. For example, Table 10 is a syntax table representing a packing structure of a texture atlas and a depth atlas.

TABLE 10

| | Descriptor |
|---|---|
| patch_data_unit( patchIdx ) { | |
|     pdu_texture_2d_pos_x[ patchIdx ] | u(v) |
|     pdu_texture_2d_pos_y[ patchIdx ] | u(v) |
|     pdu_texture_2d_delta_size_x[ patchIdx ] | se(v) |
|     pdu_texture_2d_delta_size_y[ patchIdx ] | se(v) |
|     pdu_texture_orientation_index[ patchIdx ] | u(v) |
|     pdu_texture_scale_factor[ patchIdx ] | u(v) |
|     pdu_depth_2d_pos_x[ patchIdx ] | u(v) |
|     pdu_depth_2d_pos_y[ patchIdx ] | u(v) |
|     pdu_depth_2d_delta_size_x[ patchIdx ] | se(v) |
|     pdu_depth_2d_delta_size_y[ patchIdx ] | se(v) |
|     pdu_depth_orientation_index[ patchIdx ] | u(v) |
| } | |

In Table, the syntax pdu_texture_2d_pos_x and the syntax pdu_texture_2d_pos_y represent the x-coordinate and y-coordinate of a texture patch within a texture atlas. Here, a coordinate determined based on the syntaxes may be an upper-left coordinate or center coordinate of a texture patch.

The syntax pdu_texture_2d_delta_size_x and the syntax pdu_texture_2d_delta_size_y represent a width and a height of a texture patch respectively.

The syntax patch_texture_orientation_index represents a rotational state of a texture patch. For example, the syntax patch_texture_orientation_index specifies at least one of a direction of rotation of a texture patch (clockwise or anti-clockwise), a rotation angle, whether or not the patch is flipped left and right, and whether or not the patch is flipped up and down.

The syntax pdu_texture_scale_factor represents a scaling factor of a texture patch. Based on a scaling factor indicated by the syntax pdu_texture_scale_factor, a downscaled texture patch may be restored to its original size.

The syntax pdu_depth_2d_pos_x and the syntax pdu_depth_2d_pos_y represent the x-coordinate and y-coordinate of a depth patch within a depth atlas. Here, a coordinate determined based on the syntaxes may be an upper-left coordinate or center coordinate of a depth patch.

The syntax pdu_depth_2d_delta_size_x and the syntax pdu_depth_2d_delta_size_y represent a width and a height of a depth patch respectively.

The syntax patch_depth_orientation_index represents a rotational state of a depth patch. For example, the syntax patch_depth_orientation_index specifies at least one of a direction of rotation of a depth patch (clockwise or anti-clockwise), a rotation angle, whether or not the patch is flipped left and right, and whether or not the patch is flipped up and down.

In order to render a viewport video corresponding to a user's movement based on a patch, internal and external parameter information of a camera capturing a source video, from which the patch is extracted, is required. For example, information on at least one of a focal distance of a camera, a principal point, a position, and a pose may be required for viewport video rendering.

For viewport video rendering, information on a camera parameter may be included in metadata. In order to encode information on a camera parameter, a unique identifier may be allocated to each camera. For example, Table 11 is a syntax table including a camera identifier.

TABLE 11

| | Descriptor |
|---|---|
| camera_params_list( ) {<br>    num_cameras_minus1<br>    for ( i= 0; i <= num_cameras_minus1;i++ ) {<br>        cam_id[ i ]<br>} | <br>u(16)<br><br>u(16) |

In Table 11, the syntax num_cameras_minus1 is used to determine the number of cameras. For example, num_cameras_minus1 may be a value that is obtained by subtracting 1 from a total number of cameras.

The syntax cam_id[i] represents an identifier that is allocated to the i-th camera.

A camera parameter of each patch may be derived by connecting a camera identifier (for example, cam_id) and a source video identifier (for example, view_id). In addition, internal and external parameter information of a camera with a specific identifier may be updated by considering the camera movement or shooting situation. In other words, internal and external parameter information of a specific camera may be updated by using the syntax cam_id.

Patches are used to synthesize a viewport video according to a user's movement or position. Herein, for viewport video synthesis, a camera parameter of each patch is required.

A camera parameter may have different representation modes according to coordinate systems. Accordingly, information for determining a coordinate system of a camera may be included in metadata. For example, Table 12 is a syntax table including a flag for determining a coordinate system of a camera.

TABLE 12

| | Descriptor |
|---|---|
| camera_params_list( ) {<br>    num_cameras_minus1<br>    emaf_cam_flag<br>    for ( i= 0; i <= num_cameras_minus1;i++ ) {<br>        cam_pos_x[ i ]<br>        cam_pos_y[ i ]<br>        cam_pos_z[ i ]<br>        cam_yaw[i ]<br>        cam_pitch[ i ]<br>        cam_roll[ i ]<br>    }<br>    intrinsic_params_equal_flag<br>    for ( i = 0; i <= intrinsic_params_equal_flag ? 0 : num_cameras_minus1;i++ )<br>        camera_intrinsics( [ i ] )<br>    depth_quantization_params_equal_flag<br>    for ( i = 0;i <= depth_quantization_equal_flag ? 0 :<br>            num_cameras_minus1;i++ )<br>        depth_quantization( [ i ] )<br>} | <br>u(16)<br>u(1)<br><br>u(32)<br>u(32)<br>u(32)<br>u(32)<br>u(32)<br>u(32)<br><br><br>u(1)<br><br><br>u(1)<br> |

In Table 12, the syntax omaf_cam_flag represents a coordinate system characteristic of a camera. For example, when the syntax omaf_cam_flag has a value of 1, it indicates that camera parameters are defined according to a coordinate system defined in the OMAF (Omni-directional Media Application Format) standard. On the other hand, when the syntax omaf_cam_flag has a value of 0, it indicates that camera parameters are defined according to a different coordinate system from the one defined in the OMAF standard.

When a camera parameter delivered to a device, to which an OMAF standard format is applied, is defined according to a different coordinate system from a coordinate system that is defined in the OMAF standard, information necessary for the device to analyze the camera parameter is additionally required. Accordingly, the present disclosure suggests the syntax structure 'camera_intrinsics' related to a camera parameter to which information on a coordinate system of camera is added. For example, Table 13 is a syntax table to which information on camera parameter analysis is added.

TABLE 13

| | Descriptor |
|---|---|
| camera_params_list( ) {<br>    emaf_coordinate_system_flag<br>    if(emaf_coordinate_system_flag == 0) { | <br>u(2)<br> |

TABLE 13-continued

|  | Descriptor |
|---|---|
|     positive_x | u(3) |
|     positive_y | u(3) |
|     positive_z | u(3) |
|     coordinate_system_type | u(2) |
| } |  |
| num_cameras_minus1 | u(16) |
| for ( i= 0; i <= num_cameras_minus1; i++) { |  |
|     cam_pos_x[ i ] | u(32) |
|     cam_pos_y[ i ] | u(32) |
|     cam_pos_z[ i ] | u(32) |
|     cam_yaw[i ] | u(32) |
|     cam_pitch[ i ] | u(32) |
|     cam_roll[ i ] | u(32) |
| } |  |
| intrinsic_params_equal_flag | u(1) |
| for ( i = 0; 1 <= intrinsic_params_equal_flag ? 0 : num_cameras_minus1; i++ ) |  |
|     camera_intrinsics( [ i ] ) |  |
| depth_quantization_params_equal_flag | u(1) |
| for ( i = 0; i <= depth_quantization_equal_flag ? 0 : |  |
|         num_cameras_minus1; i++ ) |  |
|     depth_quantization( [ i ] ) |  |
| } |  |

In Table 13, the syntax omaf_coordinate_system_flag indicates whether or not a camera parameter, which is input into a device, follows a coordinate system defined by the OMAF standard. For example, when the syntax omaf_coordinate_system_flag has a value of 1, it indicates that a camera parameter follows a coordinate system defined by the OMAF standard. On the other hand, when the syntax omaf_coordinate_system_flag has a value of 0, it indicates that a camera parameter does not follow a coordinate system defined by the OMAF standard. When the syntax omaf_coordinate_system_flag has a value of 0, information for specifying a coordinate system of a camera may be additionally encoded/decoded.

For example, the syntax positive_x, the syntax positive_y, and the syntax positive_z indicate directions of a camera, to which the positive directions of x-axis, y-axis and z-axis correspond respectively. For example, Table 14 shows a correlation between camera directions and the positive directions of x-axis, y-axis and z-axis according to values of the syntax positive_x, the syntax positive_y and the syntax positive_z.

TABLE 14

| positive_x, positive_y and positive_z | Definition |
|---|---|
| 0 | Front |
| 1 | Rear |
| 2 | Right |
| 3 | Left |
| 4 | Top |
| 5 | Bottom |

The syntax coordinate_system_type indicates whether a coordinate system is a left-handed coordinate system or a right-handed coordinate system. For example, when the syntax coordinate_system_type has a value of 0, it represents a left-handed coordinate system. When the syntax coordinate_system_type has a value of 1, it represents a right-handed coordinate system. Based on the syntax coordinate_system_type, a positive direction of a rotational direction (Yaw, Pitch, Roll) for each central axis may be determined.

An immersive video processing apparatus may classify source videos into a plurality of groups and independently generate an atlas video of each group. For example, after 24 source videos are classified into three groups including 8 source videos each, an atlas video may be independently generated in each group. In other words, selection of a basic video and pruning may be independently performed for each group.

As a group is set as a processing unit, image quality is improved when reproducing a viewport video and a random access to each group is permitted.

One group includes at least one basic video. In addition, a priority order of pruning may be set among groups. An atlas video of each group may be generated with reference to a pruning priority of the group.

One source video may belong to a plurality of groups. For example, a source video, which is set as a basic video of a first group, may be set as a basic video of a second group.

When video processing is performed in group units, information on a group may be included in metadata. For example, Table 15 and Table 16 are syntax tables including information on groups.

TABLE 15

|  | Descriptor |
|---|---|
| group_params( ) { |  |
|   If(group_mode) |  |
|     num_of_group | u(3) |
|     if(num_of_group > 1) |  |
|       group_id | u(4) |
|       roi_group_flag | u(1) |
| } |  |

TABLE 16

|  | Descriptor |
|---|---|
| group_params( ) { |  |
|   If(group_mode) |  |
|     num_of_group_minus1 | u(3) |
|     if(num_of_group _minus1>0) |  |
|       group_id | u(4) |
|       roi_group_flag | u(1) |
| } |  |

In Table 15, the syntax group_mode indicates whether or not video processing is performed in group units. For example, when the syntax group_mode is 1, it indicates that video processing is performed in group units. On the other hand, when the syntax group_mode is 0, it indicates that video processing is not performed in group units. When the syntax group_mode is 0, video processing may be performed by treating an entire source video as a single group.

When it is determined that video processing is to be performed in group units, information on the number of groups may be encoded/decoded. For example, the syntax num_of_groups represents the number of groups.

Alternatively, a syntax that is derived by subtracting an offset value from a total number of groups may be encoded/decoded. As in the example of FIG. 16, the syntax num_of_groups_minus1, which indicates a value obtained by subtracting 1 from a total number of groups, may be encoded/decoded.

When there is a plurality of groups, information indicating an attribute of each group may be additionally encoded/decoded.

For example, the syntax group_id represents a unique identifier of each group. An identifier indicated by the syntax group_id may be used for connection with an atlas included in a corresponding group. When there is one group, encoding/decoding of the syntax group_id may be skipped.

The syntax roi_group_flag indicates whether or not each group is a ROI group. A ROI group is a group that includes information on an important region for reproducing a viewport video or is suggested by an operator or a supervisor.

An immersive video processing apparatus may generate an atlas occupancy map by applying a threshold to an atlas. An atlas occupancy map indicates whether or not each pixel in an atlas includes necessary information for rendering. For example, when a pixel value within a depth atlas is equal to or greater than a threshold, a corresponding pixel is determined as valid, and a value of a co-located pixel with the pixel within an atlas occupancy map may be set to 1. On the other hand, when a pixel value within a depth atlas is less than a threshold, a corresponding pixel is determined as invalid, and a value of a co-located pixel with the pixel within an atlas occupancy map may be set to 0.

As many occupancy maps as the number of depth atlases may be generated. Accordingly, as the number of depth atlases is larger, the number of generated occupancy maps also increases. When the number of occupancy maps increases, the amount of data transmission and the number of video decoders required in an immersive video output apparatus may also increase. In this regard, it is worth considering to scale an occupancy map down at a specific ratio and then transmit the map.

Figure 11:
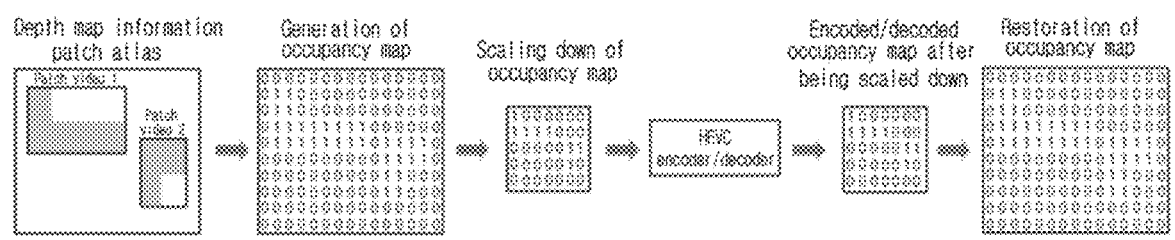
FIG. 11 shows an example of transmitting an occupancy map with reduced size.

FIG. 11 shows an example of transmitting an occupancy map with reduced size.

An immersive video processing apparatus may generate an occupancy map by comparing each pixel value within a depth atlas and a threshold. Then, after scaling down the occupancy map thus generated at a specific ratio and encoding the downscaled occupancy map, the immersive video processing apparatus may transmit the encoded occupancy map to an immersive video output apparatus.

After receiving the downscaled occupancy map, the immersive video output apparatus may restore the map to its original size and determine the validity of pixels included in a depth atlas.

Information indicating whether or not an occupancy map is scaled down may be encoded/decoded as metadata. For example, Table 17 is a syntax table including the information.

TABLE 17

| | Descriptor |
|---|---|
| miv_sequence_params( ) { | |
|     msp_occupancy_scale_enabled_flag[ i ] | u(1) |
| } | |

In Table 17, the syntax msp_occupancy_scale_enabled_flag indicates whether or not scaling of an occupancy map is permitted. When the syntax msp_occupancy_scale_enabled_flag has a value of 1, a depth atlas and an occupancy map may be different in size. On the other hand, when the syntax msp_occupancy_scale_enabled_flag has a value of 0, a depth atlas and an occupancy map have a same size.

When the syntax msp_occupancy_scale_enabled_flag has a value of 1, information indicating a scaling factor of an occupancy map may be additionally encoded/decoded. For example, the syntax occupancy_scale_factor_x, which indicates a horizontal scaling factor of an occupancy map, and the syntax occupancy_scale_factor_y, which indicates a vertical scaling factor of an occupancy map, may be encoded/decoded.

For a complete video patch, information indicating a projection format of the complete video patch may be encoded/decoded as metadata. Table 18 is a syntax table including the information for a complete video patch.

TABLE 18

| | Descriptor |
|---|---|
| atlas_params( a ) { | |
|   num_patches_minus1[ a ] | u(16) |
|   atlas_width[ a ] | u(16) |
|   atlas_height[ a ] | u(16) |
|   for( i = 0; i <= num_patches_minus1; i++ ) { | |
|     previous_view_id_equal_flag | u(1) |
|     if(previous_view_id_equal_flag==0) { | |
|       view_id[ a ][ i ] | u(v) |
|     } | |
|     patch_id[a][i] | u(v) |
|     basic_patch_flag | u(1) |
|     if(basic_patch_flag==1){ | |
|       compatible_flag[ a ][ i ] | u(1) |
|     } | |
|     patch_width_in_view[ a ][ i ] | u(v) |
|     patch_height_in_view[ a ][ i ] | u(v) |
|     patch_pos_in_atlas_x[ a ][ i ] | u(v) |
|     patch_pos_in_atlas_y[ a ][ i ] | u(v) |
|     patch_pos_in_view_x[ a ][ i ] | u(v) |
|     patch_pos_in_view_y[ a ][ i ] | u(v) |
|     patch_rotation[ a ][ i ] | u(3) |
|     if(basic_patch_flag==0){ | |
|       patch_occupancy_map_threshold[ a ][ i ] | u(v) |
|     } | |
| } | |

The syntax compatible_flag [a] [i] indicates whether or not a complete video patch is set as a projection format capable of being reproduced in the existing OMAF or 360 VR (for example, ERP, cube map, or perspective projection formation). For example, when the syntax compatible_flag [a] [i] has a value of 1, it indicates that a complete video patch is set as a projection format capable of being reproduced in the existing OMAF or 360VR. On the other hand, when the syntax compatible_flag[a] [i] has a value of 0, it indicates that a complete video patch is set as a projection format incapable of being reproduced in the existing OMAF or 360VR.

When the i-th patch is determined as a complete video patch (for example, the syntax basic_patch_flag [a] [i] has a value of 1), the syntax compatible_flag[a] [i] may be encoded/decoded.

When generating an occupancy map, a depth threshold, which is a criterion for distinguishing a valid pixel and an invalid pixel, may be encoded/decoded as metadata. Herein, the information may be encoded/decoded in each patch. For example, the syntax patch_occupancy_map_threshold[a] [i] represents a depth threshold that is used to construct an occupancy map of the i-th patch.

However, as a complete video patch consists only of valid pixels, encoding/decoding of the information may be skipped for a complete video patch. In other words, only when the syntax basic_patch_flag [a] [i] has a value of 0, the syntax patch_occupancy_map_threshold[a] [i] may be additionally encoded/decoded.

Generally, an atlas is constructed by using a basic video and a patch video from which redundant data have been removed through a pruning process. For viewport video rendering according to a user's position, it is necessary to extract an atlas including source videos that are adjacent to the user's viewpoint. In other words, for transmission of an immersive video and random access, information on a source video and a basic video included in an atlas needs to be delivered.

For example, when 16 source videos are divided into two groups including 8 source videos respectively, an atlas for a first group may be generated through a pruning process for the source videos 1 to 8, and an atlas for a second group may be generated through a pruning process for the source videos 9 to 16. When only random/spatial access or an atlas based on user location is to be used for generating a viewport video, source information of patches within an atlas and information indicating a basic video, which is to be decoded first within an atlas, are required.

Table 19 is a syntax table including information required for random access based on user location.

Information indicating whether or not a patch of a source video is included in a specific atlas may be encoded/decoded. The syntax view_enabled_in_atlas_flag[a] [i] indicates whether or not a patch of the v-th source video is included in the a-th atlas. For example, when the syntax view_enabled_in_atlas_flag [a] [v] has a value of 1, it indicates that a patch of the v-th source video is included in the a-th atlas. On the other hand, when view_enabled_in_atlas_flag[a][v] has a value of 0, it indicates that the a-th atlas does not include a patch of the v-th source video. In other words, when the syntax view_enabled_in_atlas_flag[a][v] has a value of 1, at least one patch with a source index v may be present in the a-th atlas.

However, when there is only one atlas, patches of all the source videos are included in the same atlas. Accordingly, when there is one atlas, encoding/decoding of the syntax view_enabled_in_atlas_flag[a][v] may be skipped. In other words, only when there is a plurality of atlases (for example, the syntax atlas_count_minus1 has a value greater than 0), the syntax view_enabled_in_atlas_flag[a][v] may be encoded/decoded. When encoding/decoding of the syntax view_enabled_in_atlas_flag[a][v] is skipped, the value may be considered as 1.

When the a-th atlas includes a patch that is extracted from the v-th source video, the syntax view_complete_in_atlas_flag[a][v] may be encoded/decoded which indicates whether or not the v-th source video is included in the a-th atlas as a complete video patch. When there is one atlas or the syntax view_enabled_in_atlas_flag [a] [v] has a value of 1, the syntax view_complete_in_atlas_flag[a][v] may be encoded/decoded.

For example, when the syntax view_complete_in_atlas_flag[a][v] is 1, it indicates that the v-th source video is included in the a-th atlas as a complete video patch. In other words, when view_complete_in_atlas_flag[a] [v] is 1, the v-th source video is a basic video. On the other hand, when the syntax view_complete_in_atlas_flag[a][v] is 0, it indicates that a segment video patch of the v-th source video is included in the a-th atlas. In other words, when view_complete_in_atlas_flag[a][v] is 0, the v-th source video is a pruned additional video.

TABLE 19

| | Descriptor |
|---|---|
| view_params_list( ) { | |
|     num_view_minus1 | u(16) |
|     for( a = 0; a<= atlas_count_minus1; a++ ) | |
|         for( v = 0; v<= num_views_minus1; v++ ) | |
|         if(!atlas_count_minus1) | |
|             view_enabled_in_atlas_flag[ a ][ v ] | u(1) |
|             if( view_enabled_in_atlas_flag[ a ][ v ] ) | |
|                 view_complete_in_atlas_flag [ a ][ v ] | u(1) |
|         else | |
|             view_complete_in_atlas_flag [ a ][ v ] | u(1) |

In Table 19, the syntax num_view_minus1 is used to determine the number of source videos. For example, the syntax num_view_minus1 may represent a value that is obtained by subtracting 1 from the number of source videos.

The syntax atlas_count_minus1 is used to determine the number of atlases. For example, the syntax atlas_count_minus1 may represent a value that is obtained by subtracting 1 from the number of atlases.

An immersive video processing apparatus may determine an atlas and a basic video, which are necessary to synthesize a viewport video, based on information included in the source video parameter list 'view_params_list' of Table 19.

Information indicating whether or not random/spatial access is possible may be encoded/decoded as metadata. For example, Table 20 is a syntax table including the information.

TABLE 20

| | Descriptor |
|---|---|
| view_params_list( ) { | |
|    num_view_minus1 | u(16) |
|    spatial_acess_flag | u(1) |
|      If(sptial_access_flag) { | |
|         for( a = 0; a<= atlas_count_minus1; a++ ) | |
|            for( v = 0; v<= num_views_minus1; v++ ) | |
|         if(!atlas_count_minus1) | |
|            view_enabled_in_atlas_flag[ a ][ v ] | u(1) |
|             if( view_enabled_in_atlas_flag[ a ][ v ] ) | |
|                view_complete_in_atlas_flag [ a ][ v ] | u(1) |
|            else | |
|               view_complete_in_atlas_flag [ a ][ v ] | u(1) |
| } | |

In the example of Table 20, the syntax spatial_acess_flag indicates whether or not random/spatial access is permitted. The syntax view_enabled_in_atlas_flag[a][v] and the syntax view_complete_in_atlas_flag[a] [v], which represent a mapping relationship between each source video and each atlas, may be encoded/decoded, only when the syntax spatial_access_flag has a value of 1. In other words, for each source video, spatial_access_flag may indicate whether or not view_enabled_in_atlas_flag[a][v] and view_complete_in_atlas_flag[a][v] are present.

The names of the syntax elements described in the above embodiments are temporarily given in order to describe the embodiments of the present disclosure. Different names from the ones suggested in the present disclosure may be given to syntax elements.

In the above-described embodiments, the methods are described based on the flowcharts with a series of steps or units, but the present disclosure is not limited to the order of the steps, and rather, some steps may be performed simultaneously or in different order with other steps. In addition, it should be appreciated by one of ordinary skill in the art that the steps in the flowcharts do not exclude each other and that other steps may be added to the flowcharts or some of the steps may be deleted from the flowcharts without influencing the scope of the present disclosure.

The above-described embodiments include various aspects of examples. All possible combinations for various aspects may not be described, but those skilled in the art will be able to recognize different combinations. Accordingly, the present disclosure may include all replacements, modifications, and changes within the scope of the claims.

The embodiments of the present disclosure may be implemented in a form of program instructions, which are executable by various computer components, and recorded in a computer-readable recording medium. The computer-readable recording medium may include stand-alone or a combination of program instructions, data files, data structures, etc. The program instructions recorded in the computer-readable recording medium may be specially designed and constructed for the present disclosure, or well-known to a person of ordinary skilled in computer software technology field. Examples of the computer-readable recording medium include magnetic recording media such as hard disks, floppy disks and magnetic tapes; optical data storage media such as CD-ROMs and DVD-ROMs; magneto-optimum media like floptical disks; and hardware devices, such as read-only memory (ROM), random-access memory (RAM), flash memory, etc., which are particularly structured to store and implement program instructions. Examples of the program instructions include not only a mechanical language code formatted by a compiler but also a high-level language code that may be implemented by a computer using an interpreter. The hardware devices may be configured to be operated by one or more software modules or vice versa to conduct the processes according to the present disclosure.

Although the present disclosure has been described in terms of specific items such as detailed elements as well as the limited embodiments and the drawings, they are only provided to help more general understanding of the disclosure, and the present disclosure is not limited to the above embodiments. It will be appreciated by those skilled in the art to which the present disclosure pertains that various modifications and changes may be made from the above description.

Therefore, the spirit of the present disclosure shall not be limited to the above-described embodiments, and the entire scope of the appended claims and their equivalents will fall within the scope and spirit of the disclosure.

What is claimed is:

1. An immersive video synthesizing method, the method comprising:
   parsing video data and metadata from a bitstream;
   obtaining at least one atlas from the video data; and
   extracting patches required for synthesizing a viewport video based on the metadata,
   wherein the metadata comprises a first flag indicating whether an atlas comprises information on an entire region of a first view,
   wherein the metadata comprises a second flag indicating whether the atlas comprises information on the first view, and
   wherein when a value of the second flag is true, the first flag is decoded from the metadata.

2. The immersive video synthesizing method of claim 1, wherein the metadata comprises a third flag indicating whether the first flag and the second flag are present in the metadata,
   wherein, when the third flag is true, the first flag and the second flag are decoded from the metadata.

3. The immersive video synthesizing method of claim 1, wherein the metadata comprise information indicating whether the atlas is used for view rendering or not.

4. The immersive video synthesizing method of claim 1, further comprising:
   obtaining an occupancy map corresponding to the atlas,
   wherein the metadata further comprises information indicating whether or not the occupancy map and the atlas have different sizes.

5. The immersive video synthesizing method of claim 1,
wherein the metadata comprises information on a camera coordinate system, and
wherein the information on a camera coordinate system is intended to determine a positive direction of x-axis, y-axis and z-axis.

\* \* \* \* \*